United States Patent
MacGregor

(10) Patent No.: US 8,166,064 B2
(45) Date of Patent: Apr. 24, 2012

(54) IDENTIFYING PATTERNS OF SIGNIFICANCE IN NUMERIC ARRAYS OF DATA

(75) Inventor: John MacGregor, Walldorf (GB)

(73) Assignee: Business Objects Software Limited, Dublin (IE)

(*) Notice: Subject to any disclaimer, the term of this patent is extended or adjusted under 35 U.S.C. 154(b) by 346 days.

(21) Appl. No.: 12/436,152

(22) Filed: May 6, 2009

(65) Prior Publication Data

US 2010/0287153 A1    Nov. 11, 2010

(51) Int. Cl.
G06F 7/00 (2006.01)
G06F 17/30 (2006.01)
G06F 17/00 (2006.01)
G06N 5/02 (2006.01)

(52) U.S. Cl. ........ 707/776; 707/603; 707/705; 707/722; 707/758; 706/46

(58) Field of Classification Search .................. 707/707, 707/738
See application file for complete search history.

(56) References Cited

U.S. PATENT DOCUMENTS

| | | | |
|---|---|---|---|
| 5,926,820 A | 7/1999 | Agrawal et al. | |
| 6,003,029 A | 12/1999 | Agrawal et al. | |
| 6,006,223 A | 12/1999 | Agrawal et al. | |
| 6,094,651 A | 7/2000 | Agrawal et al. | |
| 6,269,393 B1 | 7/2001 | Yost et al. | |
| 6,351,453 B1 | 2/2002 | Nolting et al. | |
| 6,542,895 B1 | 4/2003 | DeKimpe et al. | |
| 6,546,395 B1 | 4/2003 | DeKimpe et al. | |
| 6,892,208 B2 | 5/2005 | Ashida et al. | |
| 7,194,465 B1 * | 3/2007 | MacGregor | 1/1 |
| 7,480,640 B1 * | 1/2009 | Elad et al. | 706/14 |
| 2002/0091707 A1 | 7/2002 | Keller | |
| 2002/0091908 A1 | 7/2002 | Ashida et al. | |
| 2003/0023612 A1 | 1/2003 | Carlbom et al. | |
| 2003/0101201 A1 | 5/2003 | Saylor et al. | |
| 2003/0130991 A1 | 7/2003 | Reijerse et al. | |
| 2003/0229652 A1 | 12/2003 | Bakalask et al. | |
| 2005/0125474 A1 * | 6/2005 | Pednault | 708/400 |
| 2005/0235356 A1 * | 10/2005 | Wang | 726/22 |

OTHER PUBLICATIONS

Edith Namikka and George J. Gibbon; Identification of Data Mining Techniques for Industrial Process Analysis and Control; School of Electrical and Information Engineering, University of the Witwatersrand, Johannesburg; IFAC (2002).

(Continued)

*Primary Examiner* — Charles Kim
*Assistant Examiner* — Douglas McKay

(57) ABSTRACT

Disclosed is a computer method and system for identifying significance of patterns across a plurality of data patterns, which involves identifying pattern types of the plurality of data patterns, determining a relative pattern significance factor to compare the pattern types. Determining the relative pattern significance factor further involves calculating a percentage change of an identified outlier from a median for a outlier pattern, calculating a value of a step change as a percentage of a last value of a step preceding the step change for a step change pattern and calculating a percentage change from a start value on the fitted curve to an end value on the fitted curve for a trend pattern. A ranked list of the pattern types are returned based on their corresponding relative pattern significant factors.

17 Claims, 8 Drawing Sheets

OTHER PUBLICATIONS

Soundararajan E,.Joseph J.V.M, Jayakumar C. and Somasekharan M.; Knowledge Discovery Tools and Techniques; Scientific Information Resource Division, Indira Gandhi Center for Atomic Research; http://library.igcar.gov.in/readit-2005/conpro/km/s3-1.pdf (2005).

Mohammad Al Hasan; Summarization in Pattern Mining; Encyclopedia of Data Warehousing and Mining, (2nd Ed), Information Science Reference, 2008.

* cited by examiner

IDENTIFYING PATTERNS OF SIGNIFICANCE IN NUMERIC ARRAYS OF DATA

FIELD OF THE INVENTION

The invention relates to identifying patterns in a multi-dimensional database.

BACKGROUND OF THE INVENTION

On-Line Analytical Processing (OLAP) generally refers to a technique of providing fast analysis of multi-dimensional data. OLAP provides a multi-dimensional conceptual framework for data that may include support for hierarchies. This conceptual framework is advantageous since it often provides the most logical way to organize data relating to businesses or other types of organizations.

Typically, OLAP involves analyzing data stored in a multi-dimensional database. The multi-dimensional database may organize data in multiple dimensions and multiple fields along a given dimension. For example, a business may employ a five-dimensional database storing six months of weekly data relating to sales figures for fifty products that are sold in ten regions by five outlets. A user may be interested in identifying patterns associated with the sales figures in order to guide a decision-making process for the business. For instance, the user may be interested in identifying trends or unusual values associated with the sales figures. Even for this relatively simple five-dimensional database, 2500 separate time series may need to be analyzed. If additional fields or dimensions are included, the number of time series to be analyzed may be voluminous.

A given corpus of data in a multidimensional database may exhibit more than one type of data pattern. For instance, outlier patterns, step change patterns, trend patterns, random patterns and periodic patterns are just a few examples. It may be beneficial to compare these patterns to each other in order to determine which are more significant in order to make decisions based on the most significant of the patterns. Thus, there is a need for a common measure to compare disparate types of patterns to determine their significance.

SUMMARY OF THE INVENTION

Disclosed is a computer method and system for identifying significance of patterns across a plurality of data patterns, which involves receiving a data set from a multi-dimensional data source, determining a relative pattern significance factor to compare a plurality of pattern types. Determining the relative pattern significance factor further involves calculating a percentage change of an identified outlier from a median for an outlier pattern. The median is a type of average, apart from median, the average also includes mean and mode. Determining the relative pattern significance factor also involves calculating a value of a step change as a percentage of a last value of a step preceding the step change for a step change pattern and calculating a percentage change from a start value on a fitted curve to an end value on the fitted curve for a trend pattern. A ranked list of the pattern types are returned based on their corresponding relative pattern significance factors.

BRIEF DESCRIPTION OF THE DRAWINGS

A better understanding of embodiments of the invention are illustrated by examples and not by way of limitation, the embodiments can be obtained from the following detailed description in conjunction with the following drawings, in which.

DETAILED DESCRIPTION

Data, in a multi-dimensional database, may exhibit several types of patterns. In an embodiment, the pattern types are outlier patterns, step change patterns and trend patterns. The outlier pattern type further includes a positive outlier and a negative outlier. The step change pattern type further includes a positive step and a negative step. The trend pattern type further includes trend positive linear, trend positive non-linear, trend negative linear, and trend negative non-linear. The pattern types are described in detail hereafter.

Figure 1:
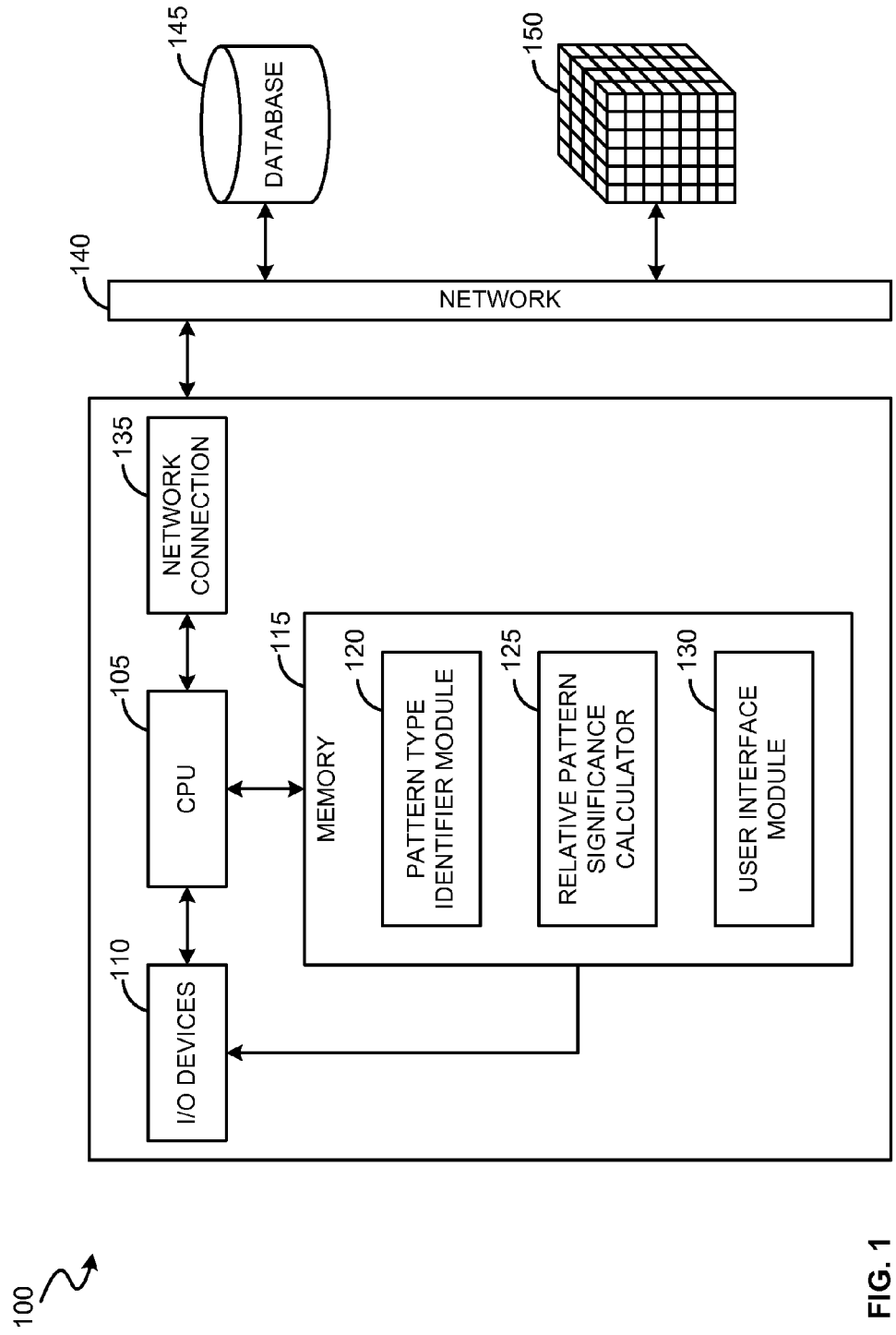
FIG. 1 is a block diagram of an exemplary computer system for identifying pattern types across a plurality of data patterns according to an embodiment of the invention.

FIG. 1 is a block diagram illustrating an exemplary computer system operable for identifying the most significant pattern type across a plurality of data patterns describing data in a multi dimensional database according to an embodiment of the invention. Computer system 100 preferably comprises a CPU 105 connected to input output devices 110, memory 115 and network connection 135. The input output devices 110 may include keyboard, mouse, display, printer (not shown in FIG. 1).

The memory 115 stores a set of computer instructions to implement the process disclosed. For instance, the memory 115 may further include a pattern type identifier module 120, a relative pattern significance calculator 125 and a user interface module 130. The pattern type identifier module 120 identifies the pattern types of the various patterns that describe data being analyzed. The identified pattern types may be, but are not limited to, outlier pattern, step change pattern and trend pattern. For instance, the pattern type identifier module 120, the relative pattern significance calculator 125 and user interface module 130 may reside in a separate computer (not shown in FIG. 1) that is connected to the network 140. The computer system 100 can query a series of data sources. These include relational data source (e.g. database 145), multi-dimensional data source (e.g., OLAP cube 150), a plurality of reports, ERP system, hierarchical database and the like.

According to one embodiment, an array of data exhibits an outlier pattern if at least one of the data values lies outside a probable range of variation associated with the array of data, that is, above an upper limit or below a lower limit. Tukey's test is one exemplary method to determine an appropriate upper and lower limit and thus identify the data as exhibiting an outlier pattern.

With reference to Tukey's test, an Inter-Quartile Range IQR may be defined as the difference between an Upper Quartile (UQ) (i.e., $75^{th}$ percentile) and a Lower Quartile (LQ) (i.e., $25^{th}$ percentile) associated with the data values of a numerical array. The UQ has a value such that 75 percent of the data values of the sequence are lesser than or equal to the UQ, while the LQ has a value such that 25 percent of the data values of the sequence are lesser than or equal to the LQ. The lower limit is set to be some value lesser than the LQ parameterized by the IQR. The upper limit is set to be some value greater than the UQ parameterized by the IQR. A data value $X_i$ of the sequence may be defined as an outlier if either one of the below relations is satisfied:

$$X_i < LQ - n \times IQR \quad (1)$$

$$X_i > UQ + n \times IQR \quad (2)$$

where IQR=UQ−LQ and n is a parameter that defines the probable range of variation (based on IQR) associated with data values of the numeric array. In general, n may be any number greater than or equal to zero. In the present embodiment of the invention, n is typically set to be equal to or greater than 1.

A step change pattern may be defined in accordance with an exemplary statistical test discussed as follows. The array, or vector, of n numeric data values (e.g., $v=[v_1, v_2, \ldots, v_n]$) may be transformed to produce the array of data. The transformation of the data results in a state such that a step in the original array of data will become an outlier in the transformed array of data. The transformed array of data is an array of n−1 data values corresponding to first differences in the original sequence e.g., vector $u=[u_2, u_3, \ldots, u_n]=[v_1-v_2, v_2-v_3, \ldots, v_n-v_{n-1}]$. According to the tests performed above for an outlier pattern, plurality of outliers may be defined for the array of data corresponding to plurality of outliers.

Linear regression and non-linear regression are exemplary statistical tests to identify trend patterns. According linear regression, a trend line is defined for data vector X comprising array of data. Using linear regression formula $$Y = a + bX \quad (3)$$

where Y represents a fitted value associated with the data vector, a represents the trend line's intercept, and b represents the slope of the trend line. The slope and intercept are calculated using $$b = \frac{n \sum XY - \sum X \sum Y}{n \sum X^2 - \sum X \sum X} \quad (4)$$

$$a = \frac{\sum Y - b \sum X}{n} \quad (5)$$

The data vector exhibits a trend pattern if statistical fit coefficient (also known as coefficient of determination) $r^2$ and statistical quantity F (also known as degree of freedom) have values lying outside a pre-selected range. Statistical fit coefficient $r^2$ and statistical quantity F are defined as $$F = \frac{r^2}{\left(\frac{1-r^2}{n-2}\right)} \quad (6)$$

$$r = \frac{n \sum XY - \sum X \sum Y}{[n \sum X^2 - \sum X \sum X \times n \sum Y^2 - \sum Y \sum Y]^{1/2}} \quad (7)$$

The statistical fit quantity $r^2$ represents the fraction of the total variation associated with the data values of the array of data accounted for by the trend line given by (3).

Alternatively, with a trend line, various types of non-linear trend curves may also defined for the array of data according to non-linear regression. The non-linear curves may be, but are not limited to, geometric regression, natural logarithm regression and exponential regression. Some non-linear regression includes linearizing pattern types and data. Other methods, such as general optimal type parameters to reduce a measure for the collective residuals between data and curve, may be used.

The geometric regression is defined by fitting data to a geometric function $$y = ax^b \quad (8)$$

The non-linear geometric regression may be transformed into linear regression by linearizing (8)

$$\log(y) = \log a + b(\log x) \quad (9)$$

Now the geometric function (8) has been linearized to (9), a line can be fitted to the logarithm of x and y, analogous to linear trend (3). The derived values from the best fit line are b and the logarithm a which, with appropriate exponentiation of log a, can be used for a best fit geometric curve.

The natural logarithm regression is defined by fitting data to exponential function $$y = ae^{bx} \quad (10)$$

The non-linear exponential regression may be transformed into linear equation for fitting by regression by applying logarithm of appropriate base $$\log y = \log a + bx \quad (11)$$

Using x and the logarithm of y a linear best fit can be calculated and transformed back to a best fit exponential function.

The relative pattern significance calculator 125 determines a relative pattern significance factor to compare pattern types based on one common measure to quantify their significance. The relative pattern significance factor is determined differently based on the type of pattern. For an outlier pattern, the relative pattern significance factor is determined by calculating a percentage deviation of the distance of an identified outlier from the average of the data set. In most embodiments, the average is the median. For a step change pattern, the relative pattern significance factor is determined by calculating a value of a step change as a percentage of a last value of a step preceding the step change. In other words converting the value in the data to inter value differences and looking for outliers. In a trend pattern, using the linear regression and the non-linear regression, it may be determined if a linear curve or a non-linear curve is fit more significantly. The best fitting curve is then selected. For a trend pattern, the relative significance pattern factor is determined by determining a degree of freedom and calculating a percentage change from a start value on the fitted curve to an end value on the fitted curve. This fitted curve is used to compute the change in value of the data over the trend. This change is a measure of importance, which in some embodiments, is converted to a percentage to use a comparable measure of significance. The user interface module 130 displays a ranked list of the of the pattern types representing the data in question based on their corresponding relative pattern significance factors. In an embodiment, the ranked list along with the corresponding values of the relative pattern significance factors is displayed in a table format.

Figure 2:
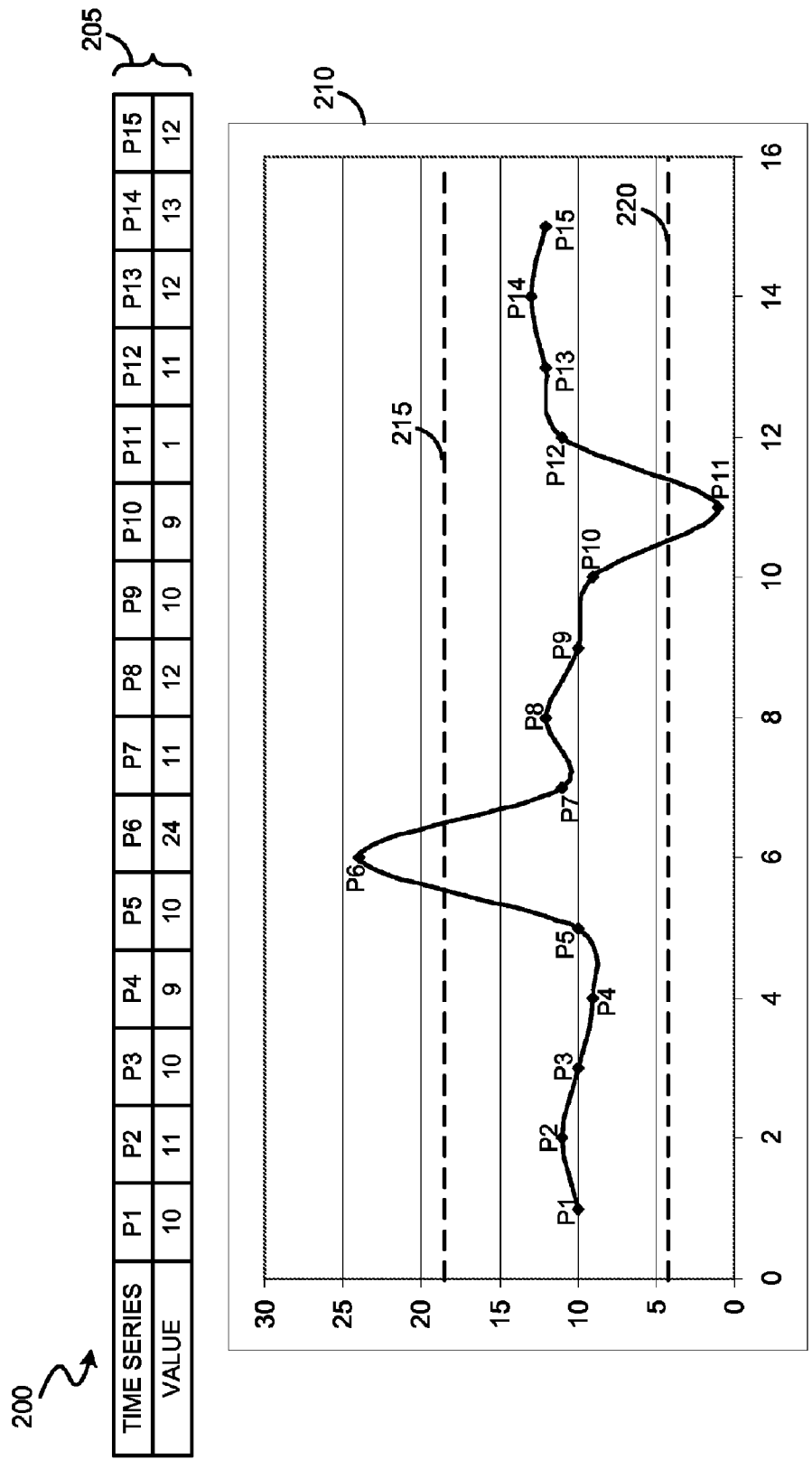
FIG. 2 is a graphical representation of an exemplary calculation for outlier pattern according to an embodiment of the invention.

FIG. 2 is a graphical representation of an exemplary calculation for outlier pattern according to an embodiment of the invention. A business scenario 200 is summarized by table 205 and graph 210. The graph 210 plots the values from table 205 on the y-axis against the time series along the x axis. A fitted curve is added as a visual aid. In graph 210 two values P6 and P11 exhibit an outlier pattern lying above an upper limit 215 and below a lower limit 220 respectively. Calculating a relative pattern significance factor for outlier involves the process of determining and calculating LQ, UQ, IQR, n, median, upper limit value, lower limit value and percentage change of the outlier from the median Referring to table 205, the median is 11, the LQ is 10 and UQ is 12. In business scenario 200, the IQR is 2, that is, the difference between UQ and LQ.

The Tukey's test is used to calculate outliers. For the purpose of illustration for business scenario 200, the value selected for n is 3.

Calculating upper limit and lower limit values involves substituting the values of LQ, UQ, n, and IQR (respectively 10, 12, 3 and 2) in the equations (1) and (2). The lower limit is 4 and upper limit is 18. These are plotted on graph 210 as a visual aid.

In graph 210 P6 is the only value that exceeds the upper limit and P11 is the only value below the lower limit. These are outliers but their relative significance needs to be calculated. The significance is the signed distance of the point from the median and expressed as a percentage of the median. For the positive outlier, the distance of P6 from the median is the difference between 24 and 11 or 13. The distance, expressed as percentage of median value, is 118.2%. For the negative outlier, the distance of P11 from the median is the difference between 1 and 11 or −10. The distance, expressed as percentage of median value, is −90.90%. The outlier P6 is a positive outlier deviated by 118.2% from the median. The outlier P11 is a negative outlier deviated by −90.90% from the median. The business scenario 200 has a positive outlier and a negative outlier. Other scenarios can have only positive or only negative outliers.

Figure 3:
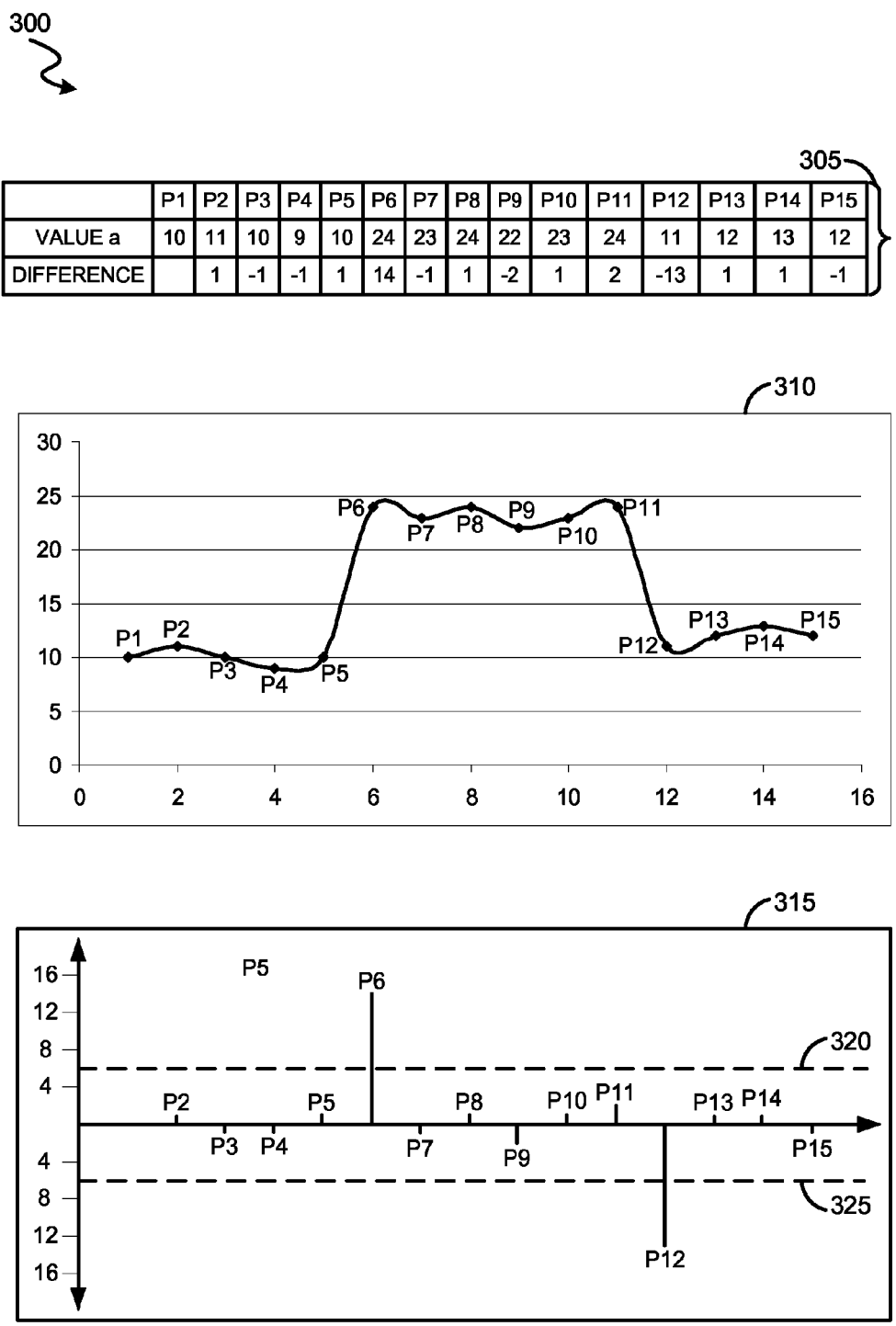
FIG. 3 is a graphical representation of an exemplary calculation for step change pattern according to an embodiment of the invention.

FIG. 3 is a graphical representation of an exemplary calculation for step change pattern according to an embodiment of the invention. A business scenario 300 is summarized by table 305. The graph 310 plots the values of business scenario 300 on the y-axis against the time series along x-axis. The graph 315 plots the inter point difference values of business scenario 300 on the y-axis against the time series along x-axis. The Tukey's test for outliers is used on the first difference of values to detect and calculate the significance of a step change. The first difference of values is calculated according to $b = [a_1 - a_2, a_2 - a_3, \ldots, a_n - a_{n-1}]$.

Calculating a relative significance pattern factor for step change pattern involves the process calculating the median, LQ, UQ, IQR, n, upper limit value, lower limit value and percentage change of the outlier from the median. The input for this calculation is the first difference (e.g., P2−P1). The median, LQ, UQ values are 1, −1 and 1. If n is pre-selected as 2.5, the upper limit is 6 and the lower limit is −6. These identify the P6 and P12 values as outliers. In graph 315, the two values P6 and P12 exhibit an outlier pattern lying above an upper limit 320 and a lower limit 325.

Analysis continues for the outliers, but with reference to the original values and not the first difference data, that is table 305, graph 310 and value a. For step change patterns the step value expressed as a percentage of the median of step values is not a good measure as it does not reflect the actual step change. Performing the analysis on the first differenced data values biases the percent changes. For example, in FIG. 3 the significance measure of P6 would be 1300%. This is an over estimate of the significance of the original data change. Embodiments of the invention take the first value of the step as a percent of the last value before the step. In other words, for a rising step, the value on top of the step minus the value at the bottom of the step, all divided by the value at the bottom. For a lowering step, the top and the bottom step are reversed.

$$\frac{a_i - a_{i-1}}{a_{i-1}}$$

The business scenario 300 has a positive step change and a negative step change. In the example of P6 this is a positive change with significance 140.00% from $(a_6 - a_5)/a_5$. The negative step has significance and one negative at −54.17% from $(a_{12} - a_{11})/a_{11}$. An alternative measure would be the average of the 'pre-step' values compared to the average of the 'post-step' values. Both of these measures are an example of a measure proportional to the difference in post step values to pre-step values expressed as a percentage.

FIGS. 4A-4D are graphical representations of exemplary calculations for trend pattern according to an embodiment of the invention. Trend pattern determination includes determining a linear regression pattern and a non-linear regression pattern. Non-linear regression pattern includes, but is not limited to, geometric regression, natural logarithm regression and exponential regression. A business scenario 400A is summarized by columns 404 and 406 illustrating values of x and y respectively. The total number of values is n=7. Table 402 also contains calculated values of xy, xx, yy and Y fitted. Row 408 illustrates summation of x, y, xy, xx, and yy values. Graph 412 illustrates values of x on x axis and values of y on y axis.

Initially calculate slope b and intercept a by substituting values of x and y in equation (4) and (5). On substituting the values of x and y in the equations, Slope $b = 5.892857$ Intercept $a = 36.42857$ Calculating statistical coefficient $r^2$ involves substituting values of x and y in equation (7). On substitution, the statistical coefficient $r^2$ is 0.919509.

Calculating the statistical fit quantity F involves substituting value of $r^2$ and n in equation (6). On substituting the values the statistical fit quantity F=27.36.

As regressing Y on X there are two variables, to refer to F table (Table 1) the number of degrees of freedom is n−2. The degree of freedom for this business scenario 400A is 5.

Referring to degree of freedom in Table 1 below, for 95% confidence, the F value is 6.61 and for 99% confidence the F value is 16.26. In the business scenario 400A, F value is 27.36. The business scenario 400A illustrates that there is significant relation between Y and X. If the calculated F value is less than 95% F value then there is no significant linear relationship between Y and X. As the F value is more than 95% F value in this business scenario 400A, there is significant relation between Y and X. Therefore, it is accepted as a fitted curve.

TABLE 1

| Degrees of Freedom | 95% Level | 99% Level |
| --- | --- | --- |
| 1 | 161 | 4052 |
| 2 | 18.51 | 98.49 |
| 3 | 10.13 | 34.12 |
| 4 | 7.71 | 21.2 |
| 5 | 6.61 | 16.26 |
| 6 | 5.99 | 13.74 |

TABLE 1-continued

| Degrees of Freedom | 95% Level | 99% Level |
|---|---|---|
| 7 | 5.59 | 12.25 |
| 8 | 5.32 | 11.26 |
| 9 | 5.12 | 10.56 |
| 10 | 4.96 | 10.04 |
| 11 | 4.84 | 9.65 |
| 12 | 4.75 | 9.33 |
| 13 | 4.67 | 9.07 |
| 14 | 4.6 | 8.86 |
| 15 | 4.54 | 8.68 |
| 16 | 4.49 | 8.53 |
| 17 | 4.45 | 8.4 |
| 18 | 4.41 | 8.28 |
| 19 | 4.38 | 8.18 |
| 20 | 4.35 | 8.1 |

Substituting the values of slope b and intercept a in equation (3) value of Y fitted is obtained. Referring to column 410, the start fitted value is 42.32143 and the end fitted value is 77.67857. A percentage change of a end fitted value from a start fitted value is calculated as $$\text{Percentage change} = [(\text{End fitted} - \text{Start fitted})/\text{Start fitted}] * 100$$
$$= (77.67857 - 42.32143)/42.32143 * 100$$
$$= 83.5443$$

Line 414 on the graph 412 illustrates a trend line from the start fitted value to end fitted value.

Figure 4A:
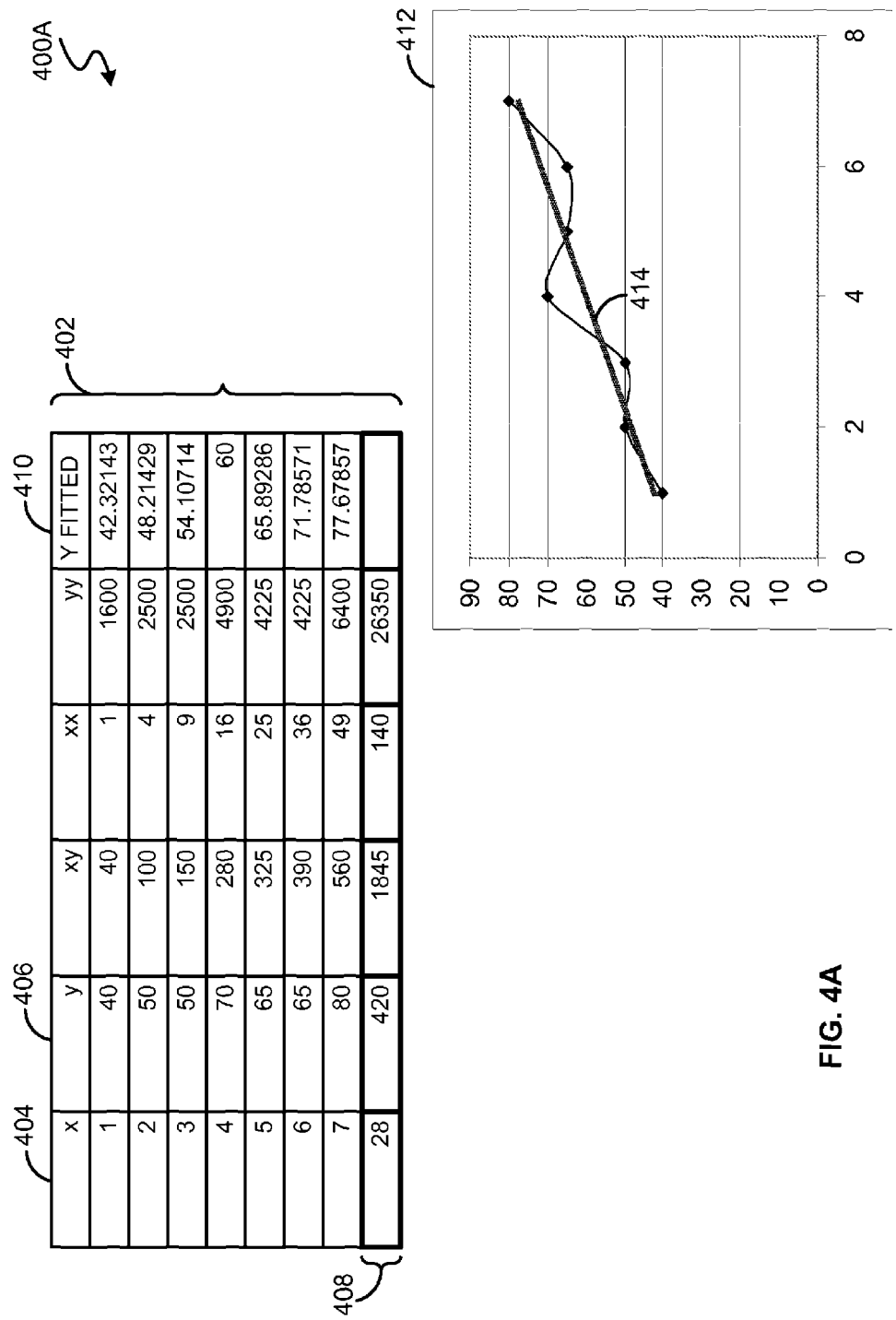
FIGS. 4A-4D are graphical representations of exemplary calculations for trend pattern according to an embodiment of the invention.
Figure 4B:
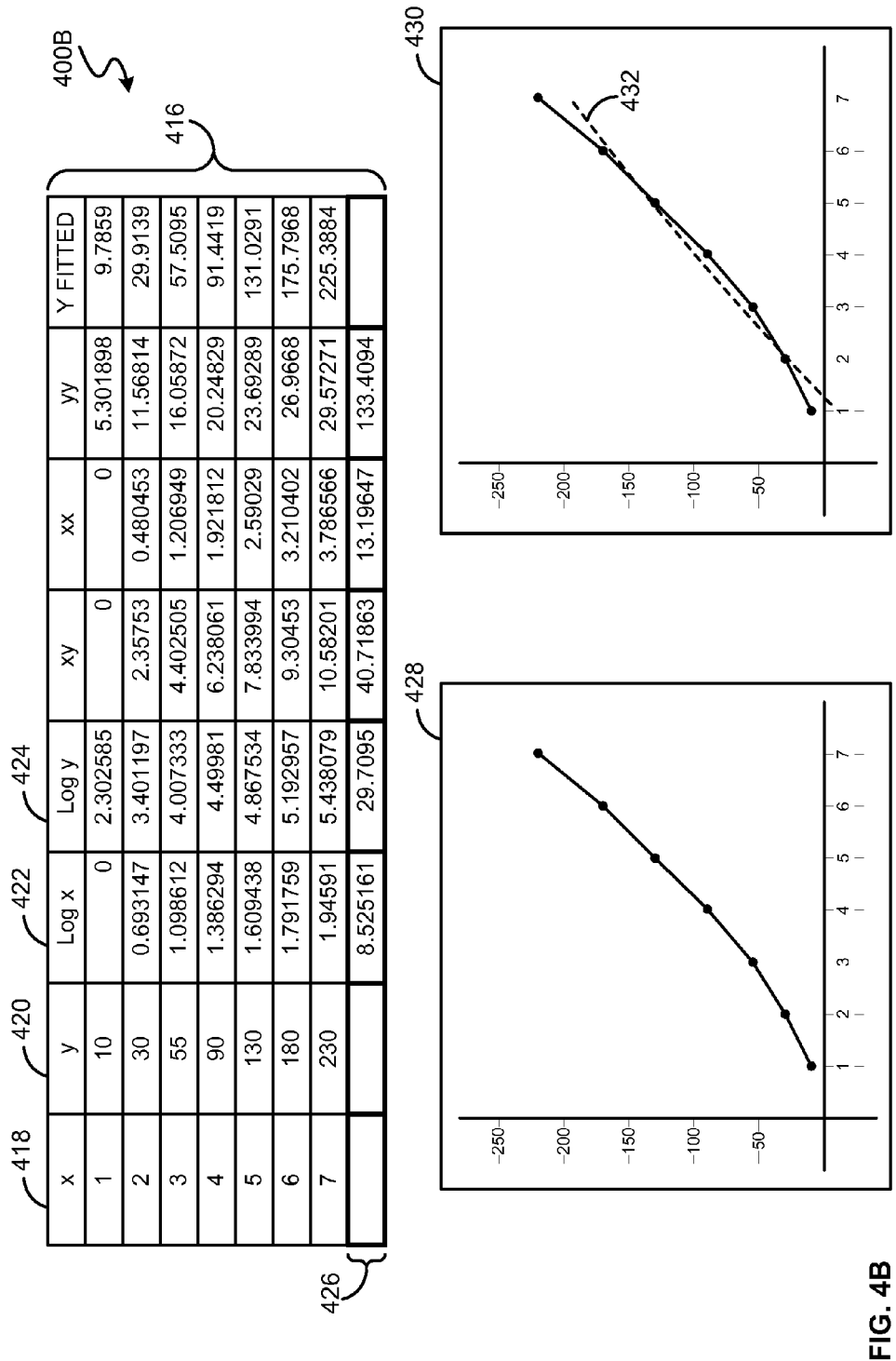
Figure 4C:
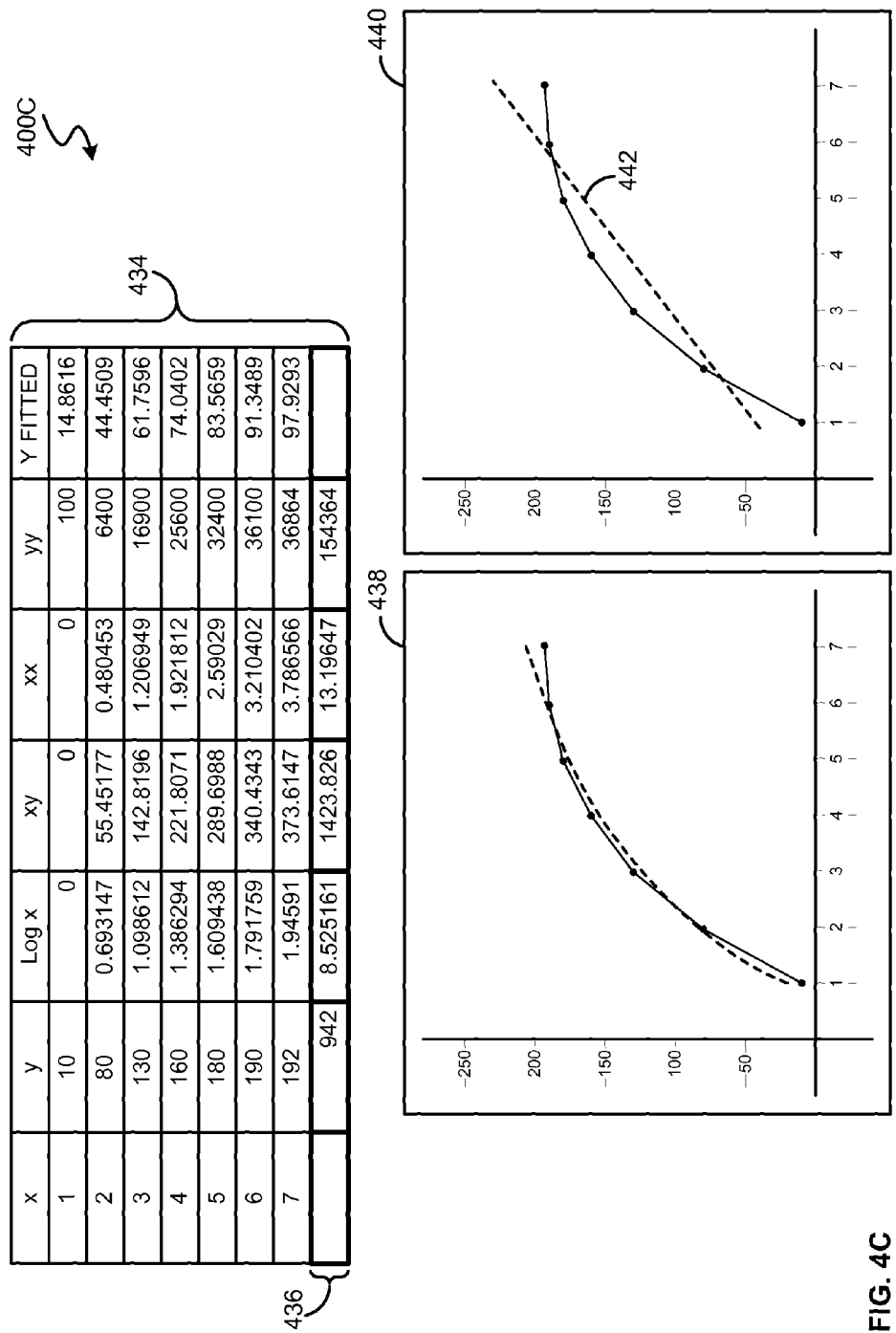
Figure 4D:
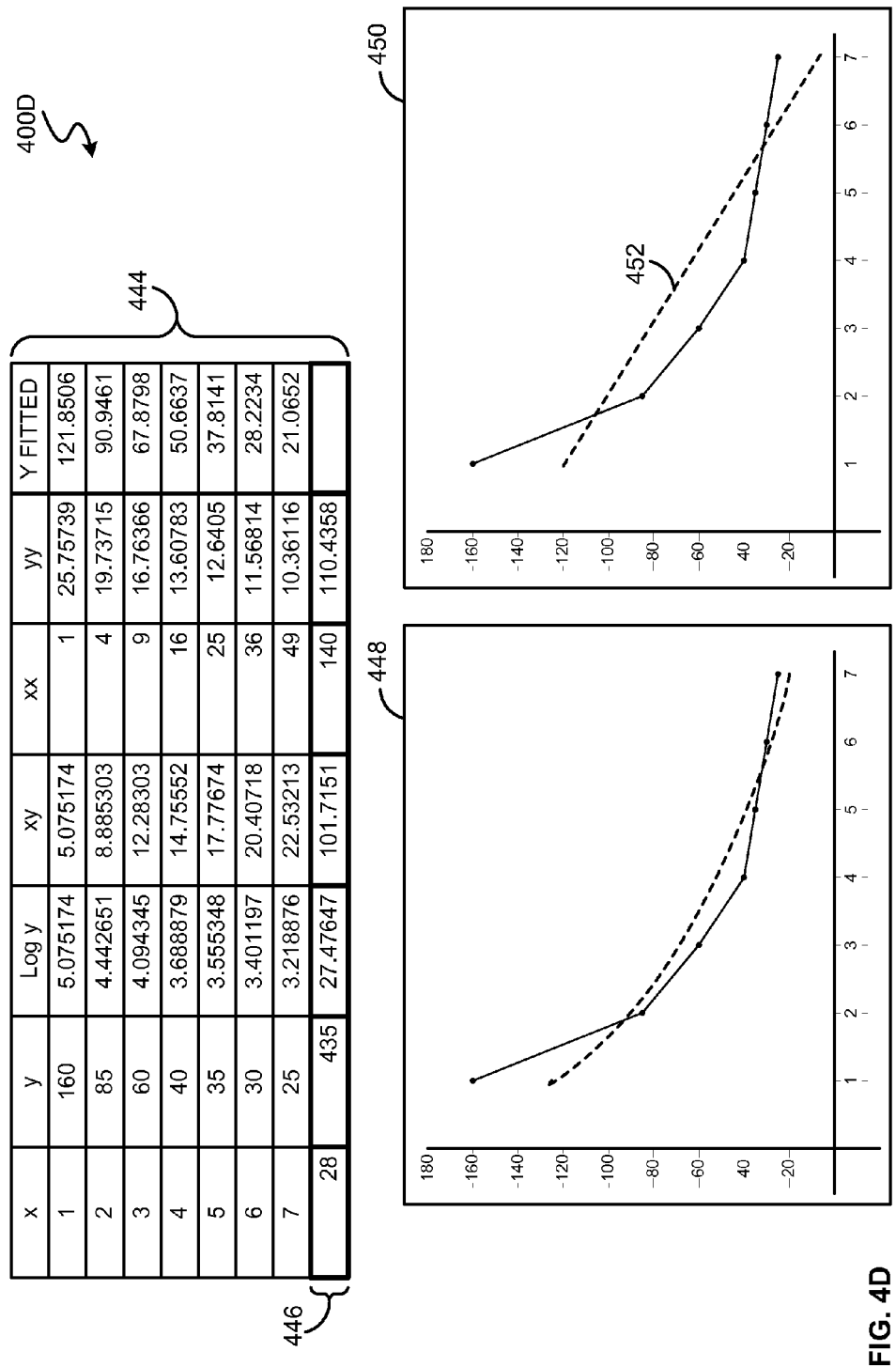

FIGS. 4B-4D illustrates a graphical representation of a non-linear trend pattern calculation. Non-linear pattern types may include, but are not limited to, geometric regression, natural logarithm regression and exponential regression.

Geometric regression equation is as given in (8). The equation is transformed to linear trend the equation becomes equation (9). In business scenario 400B of FIG. 4B, at table 416, columns 418 and 420 illustrate values of x and y. Logarithm of x and logarithm of y are calculated and tabulated in columns 422 and 424 respectively. Row 426 illustrates summation of logarithm x, logarithm y, xy, xx and yy. Graph 428 illustrates geometric curve with values of x and y plotted on x axis and y axis respectively. In business scenario 400B number of values is n=7. On transforming non-linear to linear equation results in equation (9). The calculation of slope b and intercept a is the same as explained in FIG. 4A. The calculation of the statistical fit quantity F and statistical coefficient r2 is also as explained in FIG. 4A. The degree of freedom is 5. Referring to the degree of freedom in Table 1 above, for degree of freedom 5, 95% confidence F value is 6.61 and 99% confidence F value is 16.26. In the business scenario 400B, F value is 9748.48.

On linear transformation of the geometric regression, statistical fit quantity F is 195.6575. Graph 430 illustrates trend line 432 after a linear transformation.

The percentage change for geometric regression, natural logarithm regression and exponential regression is calculated in the same way as percentage calculation for linear regression pattern. Referring to table 416, the start fitted value is 9.7859 and the end fitted value is 225.3884. The percentage change for geometric regression is 2,203.1898.

Natural logarithm regression is defined by fitting data to exponential regression equation is as given in (10). The equation is transformed to linear trend the equation becomes equation (11). In business scenario 400C of FIG. 4C, table 434 illustrates values of x and y. Logarithm of x and logarithm of y are calculated and tabulated in table 434. Row 436 illustrates summation of x, y, logarithm x, xy, xx and yy. In business scenario 400C, number of values is n=7. Graph 438 illustrates a natural logarithm regression curve. On transforming non-linear to linear equation results in equation (11). The calculation of slope b and intercept a is the same as explained in FIG. 4A. The calculation of the statistical fit quantity F and statistical coefficient $r^2$ is also as explained in FIG. 4A. The degree of freedom is 5. Referring to the degree of freedom in Table 1 above, for degree of freedom 5, 95% confidence F value is 6.61 and 99% confidence F value is 16.26. In the business scenario 400C, F value is 330.4475 and statistical coefficient $r^2$ is 0.985095.

On linear transformation of the natural logarithm regression, statistical fit quantity F and statistical coefficient $r^2$ is 31.14963 and 0.861686 respectively. Graph 440 illustrates trend line 442 after a linear transformation.

Referring to table 434, the start fitted value is 14.8616 and the end fitted value is 97.9293. The percentage change for natural logarithm regression is 558.9419.

Exponential regression equation is as given in (10). The equation is transformed to linear trend the equation becomes equation (11). In business scenario 400D of FIG. 4D, table 444 illustrates values of x and y. Logarithm of x and logarithm of y are calculated and tabulated. Row 446 illustrates summation of logarithm y, xy, xx and yy. In business scenario 400D number of values is n=7. Graph 448 illustrates a exponential regression curve. On transforming non-linear to linear equation results in equation (11). The calculation of slope b and intercept a is the same as explained in FIG. 4A. The calculation of the statistical fit quantity F and statistical coefficient $r^2$ is also as explained in FIG. 4A. The degree of freedom is 5. Referring to the degree of freedom in Table 1 above, for degree of freedom 5, 95% confidence F value is 6.61 and 99% confidence F value is 16.26. In the business scenario 400D, F value is 63.42967 and statistical coefficient $r^2$ is 0.926932.

On linear transformation of the exponential regression, statistical fit quantity F and statistical coefficient $r^2$ is 15.6441 and 0.7578 respectively. Graph 450 illustrates trend line 452 after a linear transformation.

Referring to table 444, the start fitted value is 121.8506 and the end fitted value is 21.0652. The percentage change for exponential regression is −82.71.

Referring to FIG. 2, FIG. 3, and FIGS. 4A-4D, the ranked list of the relative pattern significance factors will be:

| | |
|---|---|
| Trend Linear Positive | 83.54% |
| Step Change Positive | 140.00% |
| Outlier Positive | 118.2% |
| Outlier Negative | 90.90% |
| Step Change Negative | 54.17% |

Figure 5:
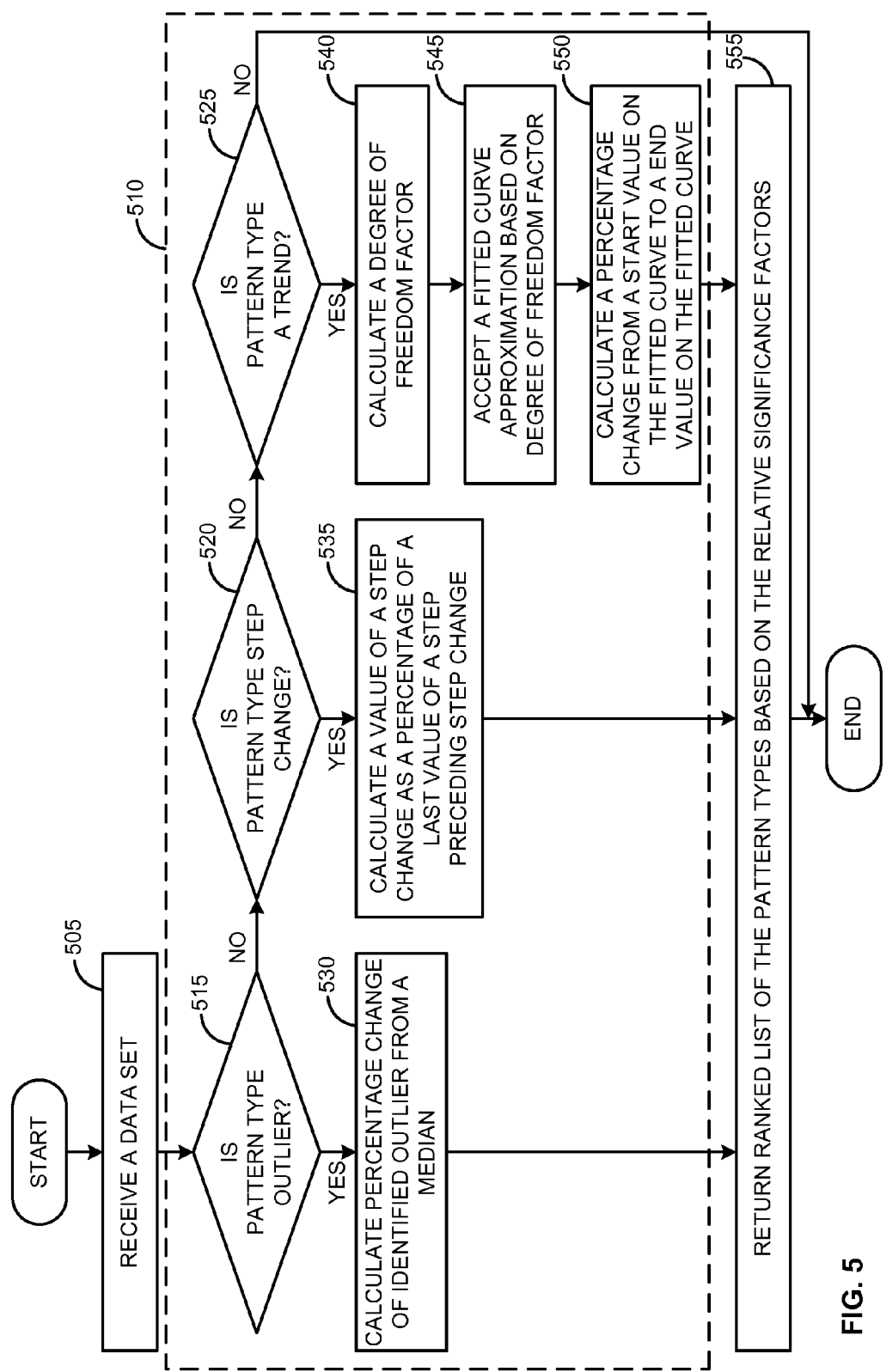
FIG. 5 is a flow diagram of an embodiment of the invention for identifying the significance of a pattern across a plurality of data patterns.

FIG. 5 is a flow diagram for identifying significance of patterns across a plurality of data patterns. At process block 505, a data set is received. The data set includes a plurality of data vectors. In some embodiments, the data set is a result set from a query to a multi-dimensional data source. Relative pattern significance factor determination technique for the plurality of data patterns is illustrated in 510. From process block 505 the process proceeds to decision block 515. At decision block 515, it is determined if a pattern type is outlier. If the pattern type is an outlier, the process proceeds to process block 530. At process block 530, a percentage change of the outlier from a median is calculated. The process proceeds to process block 555. At process block 555, ranked list of pattern types based on their corresponding relative significance factors are returned.

If the pattern type is not an outlier, the process proceeds to decision block 520. At decision block 520, it is determined if the pattern type is a step change pattern. If the pattern type is a step change pattern, the process proceeds to process block 535. At process block 535, a value of a step change is calculated as a percentage of the last value of a step preceding the step change. The process proceeds to process block 555. At process block 555, ranked list of pattern types based on their corresponding relative significance factors are returned.

If the pattern type is not a step change pattern, the process proceeds to decision block 525. At decision block 525, if the pattern change is a trend pattern the process proceeds to process block 540 to calculate a degree of freedom factor. A fitted curve approximation is accepted based on the degree of freedom at process block 545. The percentage change of trend from a start value on the fitted curve to an end value on the fitted curve is calculated at process block 550. The process then proceeds to process block 555. At process block 555, ranked list of pattern types based on their corresponding relative significance factors are returned. In some embodiments, the ranked list is returned to a calling entity which may automatically select the most significant pattern. If the pattern type is not a trend pattern, the process ends.

Elements of embodiments of the present invention may also be provided as a tangible machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of tangible machine-readable media suitable for storing electronic instructions. For example, the present invention may be downloaded as a computer program which may be transferred from a remote computer (e.g., a server) to a requesting computer (e.g., a client) by way of a communication link (e.g., a modem or network connection).

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. The detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

What is claimed is:

1. An article of manufacture, comprising: a non-transitory machine readable storage medium comprising instructions which when executed by a machine cause the machine to perform operations comprising:
based on a query performed on a multidimensional data source, receiving a data set including a plurality of data patterns;
identifying, by a processor, a pattern type of each data set, to determine corresponding pattern significance factors associated with the plurality of data patterns, the determining comprising:
when the pattern type is an outlier pattern, calculating a percentage change of an identified outlier from a median;
when the pattern type is a step change pattern, calculating a percentage of a step change between a last value of a step and a first value preceding the step, wherein the step corresponds to an outlier in a first difference on the data set; and
when the pattern type is a trend pattern, calculating a degree of freedom factor, accepting a fitted curve approximation based on the degree of freedom factor and calculating a percentage change from a start value on the fitted curve to an end value on the fitted curve; and
comparing the calculated pattern significance factors of the outlier pattern, the step change pattern and the trend pattern to display a ranked list of the pattern types based on their corresponding pattern significance factors on a user interface.

2. The article of manufacture in claim 1, wherein determining the trend pattern comprises determining a linear regression for the data set for a linear fitted curve.

3. The article of manufacture in claim 1, wherein determining the trend pattern comprises determining a non-linear regression for the data set for a non-linear fitted curve.

4. The article of manufacture in claim 3, wherein determining the non-linear regression for the data set comprises transforming the non-linear regression to a linear regression.

5. The article of manufacture in claim 3, wherein the non-linear regression pattern is selected from a geometric regression pattern, a natural logarithm regression pattern or an exponential regression pattern.

6. The article of manufacture in claim 1, wherein calculating the percentage of the step change further comprises a difference between a first average of values after a step and a second average for values after the step.

7. The article of manufacture in claim 1, wherein the data set is included in the multi-dimensional data source.

8. The article of manufacture in claim 1, wherein calculating the percentage change from the start value on the fitted curve to the end value on the fitted curve comprises accepting the fitted curve if the value of freedom factor is more than 95% of the freedom factor.

9. A computer implemented method to identify significance of patterns across a plurality of data patterns, the method comprising:
based on a query performed on a multidimensional data source, receiving a data set including a plurality of data patterns;
identifying, by a processor, a pattern type of each data set, to determine corresponding pattern significance factors associated with the plurality of data patterns, the determining comprising:
when the pattern type is an outlier pattern, calculating a percentage change of an identified outlier from a median;
when the pattern type is a step change pattern, calculating a percentage of a step change between a last value of a step and a first value preceding the step, wherein the step corresponds to an outlier in a first difference on the data set; and when the pattern type is a trend pattern, calculating a degree of freedom factor, accepting a fitted curve approximation based on the degree of freedom factor and calculating a percentage change from a start value on the fitted curve to an end value on the fitted curve; and comparing the calculated pattern significance factors of the outlier pattern, the step chance pattern and the trend pattern to display a ranked list of the pattern types based on their corresponding pattern significance factors on a user interface.

10. The computer implemented method of claim 9, wherein determining the trend pattern comprises a linear regression for the data set.

11. The computer implemented method of claim 9, wherein determining the trend pattern comprises a non-linear regression for the data set.

12. The computer implemented method of claim 11, wherein determining the non-linear regression for the data set comprises transforming the non-linear regression to a linear regression.

13. The computer implemented method of claim 11, wherein the non-linear regression comprises a geometric regression.

14. The computer implemented method of claim 11, wherein the non-linear regression comprises a natural logarithm regression.

15. The computer implemented method of claim 11, wherein the non-linear regression comprises an exponential regression.

16. The computer implemented method of claim 9, wherein displaying a ranked list based on their corresponding pattern significance factors comprises displaying the ranked list in a table format.

17. A computer system to identify significance of patterns across a plurality of data patterns, comprising:
- a processor to read and execute instructions stored in one or more memory elements; and
- the one or more memory elements storing instructions related to:
  - a multidimensional data source to render a data set including a plurality of data patterns, based on a query performed;
  - a pattern type identifier module to identify a pattern type of each data set to determine corresponding pattern significance factors associated with the plurality of data patterns;
- a pattern significance calculator in communication with the pattern type identifier to
  - determine corresponding pattern significance factors by
    - calculating a percentage change of an identified outlier from a median when the pattern type is an outlier pattern;
    - calculating a percentage of a step change between a last value of a step and a first value preceding the step, wherein the step corresponds to an outlier in a first difference on the data set, when the pattern type is a step change pattern;
    - calculating a degree of freedom factor, accepting a fitted curve approximation based on the degree of freedom factor and calculating a percentage change from a start value on the fitted curve to an end value on the fitted curve, when the pattern type is a trend pattern; and
  - compare the plurality of pattern significance factors of the outlier pattern, the step change pattern and the trend pattern; and
- a user interface in communication with the pattern significance calculator to display a ranked list of the pattern types based on the corresponding pattern significance factors.

* * * * *